March 25, 1952  C. C. FLOYD ET AL  2,590,763
TRIMMING FOR LICENSE PLATES
Filed Nov. 4, 1949
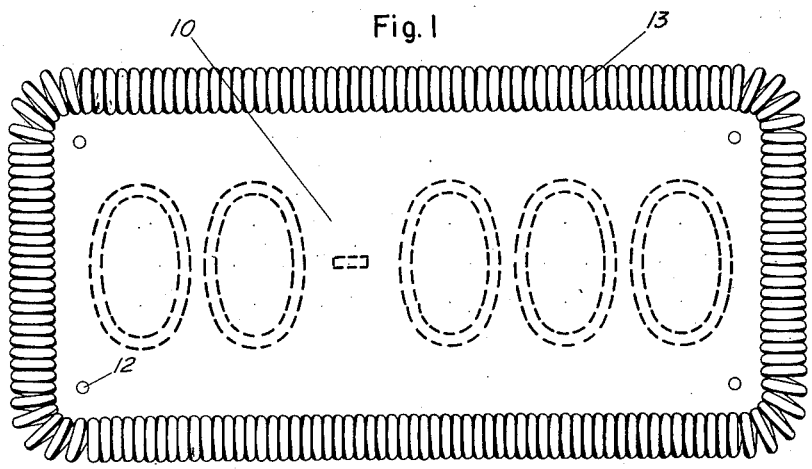
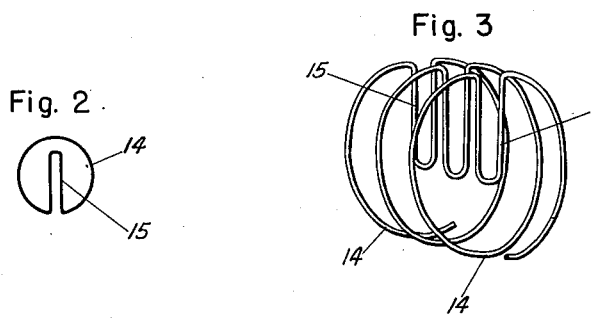
INVENTORS
Claude C. Floyd
BY James H. Norman
Jess L. Beasley, Jr.
ATTORNEY Patented Mar. 25, 1952

2,590,763

UNITED STATES PATENT OFFICE 2,590,763

TRIMMING FOR LICENSE PLATES

Claude C. Floyd and James H. Narron,
Arlington, Va.

Application November 4, 1949, Serial No. 125,535

9 Claims. (Cl. 40—125)

This invention relates to edge trimming or framing devices for plates, especially license or registration plates for motor vehicles. It has for its object to provide an inexpensive garniture or trimming means comprising a flexible edging strip adapted to be made out of material which is formed into a spring, for stretching around the rim of a license plate to ornament the same and to act as a protector against injury to the hands when cleaning the vehicle or performing other operations upon or in the vicinity of the plate.

Another object of the invention is to provide a device of this character which is readily adaptable to plates of various sizes and easily installed.

A further object of the invention is to provide a coiled spring having a continuous groove recessed therein and adapted to cover and enclose the edges of a license plate.

Of the accompanying drawing, Fig. 1 is a front elevation of a license plate and a spring garniture applied thereto according to our invention.

Fig. 2 is a cross-sectional view of a modification of the spring frame.

Fig. 3 is a perspective view of segment of the spring frame illustrated in Fig. 2, expanded for better view of the details thereof.

In the drawing, 10 represents a conventional sheetmetal license or registration plate such as commonly provided for motor vehicles, adapted to be impressed with the usual designations for identifying the vehicle. The plate has rounded corners and the usual holes 12 near the corners for receiving the screws by which the plate is attached to a holder bracket (not shown). The spring frame 13 is shown in place about the license plate in Fig. 1. For purposes of illustration the loops of the spring are enlarged out of proportion to the size of the license plate. As usually designed, the loops of the spring are of a relatively fine wire and the loops lie close together even when distorted about the corners of the plate. It will be understood that wire of various sizes can be used, but when the preferred steel wire is employed, it may be between 10 and 20 gauge. Each loop 14 of the spring has a regular indentation 15 which forms a continuous groove along a side of the spring. In use the indentations form a continuous groove on the inside of the spring frame, which is adapted to fit securely over the edge of the plate.

The spring frame may be formed from any material which is resilient and capable of being molded into the desired shape. Suitable materials include metal, such as spring steel wire, certain plastics, celluloid and similar elastic material. As stated above, a preferred material is relatively fine spring steel wire of shiny surface which is particularly attractive and resistent to corrosion.

The spring may be manufactured in the conventional manner and the indentations impressed by clamping in a suitable mold. Spring steel coils can be preformed before being tempered if desired or molded into shape after tempering if the spring remains sufficiently deformable under reasonable pressure. Furthermore, although the spring frame is illustrated as a coiled wire with the appropriate indentations, the spring may also be of other general shapes such as oval, elliptical, conical or rectangular to present a frame of various external contours. Thus, the frame as seen in place about the plate will appear to consist of a series of individual separate loops of wire beginning on one side of the plate and terminating directly opposite on the other side of the plate.

Preferably, the frame is a continuous spring somewhat less in extent than the total perimeter of the plate so that when it is in position about the plate it is slightly expanded. However, the frame can be a single length of spring, the ends of which may be fastened together or to the plate in any suitable manner. The stretching of the spring about the plate will cause the spring frame to adhere snugly to the edge of the plate and enhance the tenacity of the frame about the plate. If desired, the spring may be attached to the plate or to the plateholder at several places around the spring, as by a clasp hooked in one or more of the loops and fastened to the holder, or by a pin having on one end a pair of oppositely branching arms which can be inserted between a pair of the loops and enclosed inside the spring and having on the other a means by which the pin can be fastened to the holder. The expansibility of the spring makes it readily adaptable for plates of varying sizes. Ordinarily the length of the spring can be about 30 to 34 inches in length to accommodate the larger plates and 26 to 30 inches in length to accommodate the usual smaller plates.

The described garniture combines attractiveness of design, facility of installation, adaptability and utility of construction. Thus the spring trimming provides an ornamental edging for license plates, serving to deaden the vibrations thereof, to protect the edges of the plate from weathering, and protects the hands of an operator against coming in contact with the sharp edges of the plate when cleaning or servicing the vehicle in the vicinity of the plate.

Although the garniture has been described in particular with reference to a license plate, it is equally adaptable to any article which has relatively thin edges. The spiral spring with its groove is stretched about the edges of the article and, because of its resilience, the spring fits the article closely, forming in effect a frame or holder for the article. The wire from which the spring is formed may be either smooth or sinuous. Also, if desired, the indented spring may be manufactured so that only the section of the loop forming the indentations is dimpled or sinuous. Where the indented portion of the spring is wavy, the effectiveness of spring to remain in place about the article is increased.

It is understood that springs may be painted if desired, or may be coated with various material, such as plastic or fabric. Various alloys may be used for metallic springs and where effective, pigments or colored material may be incorporated directly into the body of the material of which the spring is made.

Various other modifications and changes may be made without departing from the spirit of the invention as disclosed and claimed.

We claim:

1. A trimming frame for a license plate which consists of an endless spiral spring having in each loop thereof a regular indentation at the same point in each loop thereof to provide along the inner face of said spring a continuous groove adapted to receive the edge of said license plate.

2. A trimming frame for a license plate which consists of a helical coil spring having in each loop thereof a regular indentation at the same point in each loop thereof to provide in said spring a continuous groove adapted to cover and securely fit the edges and adjacent sides of said plate.

3. A license plate frame according to claim 2 in which said spring consists of spring steel wire.

4. A novel frame for an article of relatively thin edges, which consists of an elastic coil spring having a continuous groove formed by a regular indentation at the same point in each loop of said spring parallel to the longitudinal axis thereof and adapted to securely fit and to conform to the contour of the edges of said article.

5. A frame according to claim 4 in which said spring is of a sinuous wire.

6. A frame according to claim 4 in which the section of each loop forming said indentation is dimpled.

7. The combination of a license plate and an edge-enveloping elastic spring having a continuous recessed groove throughout its length parallel to its longitudinal axis, said groove being formed by a regular indentation at the same point in each successive loop of said spring.

8. The combination with a license plate, of an endless spiral spring having in each loop thereof a regular indentation at the same point in each loop to provide along the inner face of said spring a continuous recessed groove, said groove covering the edges and a narrow section of the sides of said plate adjoining the edges.

9. A helical spring having a single regular indentation at the same point in each loop thereof to form a continuous recessed groove throughout the length of the spring along the longitudinal axis thereof, each loop of the spring consisting in cross section of an outer loop broken at the points at which the loop bends back on itself toward the center of said loop to form thereby said indentation the sides of which comprise an inner loop located inside of and in the same plane as said outer loop.

CLAUDE C. FLOYD.
JAMES H. NARRON.

REFERENCES CITED

The following references are of record in the file of this patent:

UNITED STATES PATENTS

| Number | Name | Date |
| --- | --- | --- |
| 1,490,716 | Schwenker | Apr. 15, 1924 |
| 1,541,124 | Dunham | June 9, 1925 |
| 2,136,906 | McAdams | Nov. 15, 1938 |
| 2,499,747 | Griffith | Mar. 7, 1950 |